(12) United States Patent
Kim et al.

(10) Patent No.: US 7,330,810 B2
(45) Date of Patent: Feb. 12, 2008

(54) METHOD AND APPARATUS FOR DEVELOPING A TRANSFER DICTIONARY USED IN TRANSFER-BASED MACHINE TRANSLATION SYSTEM

(75) Inventors: Seong Mook Kim, Seoul (KR); Chang Woo Min, Seoul (KR); Sang Chul Kang, Seoul (KR); Jeong In Cha, Seoul (KR)

(73) Assignee: International Business Machines Corporation, Armonk, NY (US)

( * ) Notice: Subject to any disclaimer, the term of this patent is extended or adjusted under 35 U.S.C. 154(b) by 915 days.

(21) Appl. No.: 10/455,098

(22) Filed: Jun. 5, 2003

(65) Prior Publication Data

US 2003/0233226 A1 Dec. 18, 2003

(30) Foreign Application Priority Data

Jun. 7, 2002 (KR) ...................... 10-2002-0031861

(51) Int. Cl.
G06F 17/28 (2006.01)
G06F 17/27 (2006.01)

(52) U.S. Cl. ........................................... 704/4; 704/10
(58) Field of Classification Search ................ 704/1–10
See application file for complete search history.

(56) References Cited

U.S. PATENT DOCUMENTS

| | | | |
|---|---|---|---|
| 4,685,060 A * | 8/1987 | Yamano et al. ................. | 704/4 |
| 5,285,386 A | 2/1994 | Kuo | |
| 5,426,583 A | 6/1995 | Uribe-Echebarria | |
| 5,477,450 A | 12/1995 | Takeda et al. | |
| 6,119,077 A | 9/2000 | Shinozaki | |

FOREIGN PATENT DOCUMENTS

GB 2213971 8/1989

(Continued)

OTHER PUBLICATIONS

H. Kaji, Y Kida, and Y. Morimoto, "Learning Translation Templates From Bilingual Text", Proc. Of COLING, Nantes, Aug. 23-28, 1992.*

(Continued)

*Primary Examiner*—David Hudspeth
*Assistant Examiner*—Samuel G Neway
(74) *Attorney, Agent, or Firm*—Norman L. Gundel; Hoffman, Warnick & D'Alessandro LLC (57) ABSTRACT

Generating a transfer dictionary used in a transfer-based translation machine system. A pair of source/target language sentences are received. The source language sentence comprises at least one marked idiom, at least one argument and at least one marked collocation. The target language sentence comprises the target language translation for the idiom and the source language word(s) for the argument. The source language sentence is parsed to generate a source language syntactic tree. Nodes are extracted from the source language syntactic tree. A least common ancestor node of the extracted nodes is calculated and source language structure information is generated based on the source language syntactic tree data structure. Target language structure information is generated by adding the part-of-speech information to each morpheme in the target language sentence and by replacing each source language word in the target language with the corresponding syntactic information within the source language syntactic tree.

4 Claims, 8 Drawing Sheets

FOREIGN PATENT DOCUMENTS

| | | |
|---|---|---|
| JP | 8329089 | 12/1996 |
| JP | 11015828 | 1/1999 |
| WO | WO 01/55901 A1 | 8/2001 |

OTHER PUBLICATIONS

J. Kinoshita, "A Transfer Dictionary for Words and Bigrams", Proc. of the 14th Brazilian Symposium on Artificial Intelligence: Advances in Artificial Intelligence, 1998.*

Insu Kang et al., "Cross-Language Text Retrieval by Query Translation Using Term Reweighting", International Journal of Pattern Recognition and Artificial Intelligence, Aug. 2000, vol. 14, Issue 5, pp. 617-629.

Redondo et al., English-Spanish Bilingual Dictionary for a Machine Assisted Translation System, Technical Disclosure Bulletin, No. 11, Apr. 1991, pp. 234-235.

Nagao et al., "Transfer Mechanism in Machine Translation Using Dependency Structures as a Knowledge Base", Sep. 1990, pp. 92-95.

Masahiro, M. et al. "Combined Word Retrieval for Bilingual Dictionary Based on the Analysis on Cmpound Words". Transactions of Information Processing Society of Japan, vol. 35 No. 4, pp. 743-754.

* cited by examiner

| Source language sentence | Target language sentence | index | source language structure info. | Target language structure info. | idiom |
|---|---|---|---|---|---|
| The + man *has *no *idea what she meant by those words | man 이 meant ㄴ 지를 모르다 | have:v | s> (? <$this> (subj <<man:n>>)) <idea:n> (obj <ndet <no:det>) (nobj)) | t>$subj+ 가 /js $nobj+ ㄴ /jс 지/ec+ 를/jo 모르/pv | have:v idea:n no:det |
| He *puts *on his + coat. | He가 coat를 입다 | put:v | s> (? <$this> (subj <on:prep>) (comp (obj<<coat:n>>))) | t> $subj+ 가 /js $obj+ 를/jo 입/pv | put:v on:prep |
| I *put *on the + shoes. | I가 shoes를 신다 | put:v | s> (? <$this> (subj <on:prep>) (comp (obj<<gloves:n>>))) | t> $subj+ 가 /js $obj+ 를/jo 신/pv | put:v on:prep |

METHOD AND APPARATUS FOR DEVELOPING A TRANSFER DICTIONARY USED IN TRANSFER-BASED MACHINE TRANSLATION SYSTEM

BACKGROUND OF THE INVENTION

1. Field of the Invention

The present invention relates to a method and an apparatus for developing a transfer dictionary used in a transfer-based machine translation system.

2. Related Art

In order to facilitate the understanding of new information written in any foreign language, a machine translation system that mechanically translates sentences from one language into another language (for example, English into Korean) have become widely used.

Most of commercial machine translation systems are embodied in a "transfer-based" mechanism, which is comprised of the steps of parsing, transferring and generating. First, in the parsing step, a given source language sentence will be parsed using a parsing dictionary and parsing rules to obtain simplified syntactic information of the given sentence, which clarifies the syntactic ambiguity. Such source language syntactic information is generally represented and stored in a tree-type data structure, which is called a "source language syntactic tree." Second, in the transferring step, the source language syntactic information will be transferred to target language syntactic structure information, which is also a simplified syntactic structure of a corresponding target language sentence, using a "transfer dictionary." In the transfer dictionary, the corresponding relationships between them are stored on a phrase basis. Finally, in the generating step, the target language sentence is generated based on the target syntactic structure information. For the details of the transfer-based machine translation system, please refer to "Makoto Nagao, Chapter 7 Machine Translation, Comprehension of Natural Language."

Because syntactic and semantic differences between a source language and a target language are adjusted by referring to the transfer dictionary, the transfer dictionary is a very important factor for translation quality. Conventionally, in order to develop a transfer dictionary, a linguistic expert, who knows the characteristics of vocabularies and syntax about the source language and the target language very well, has to specifically define the corresponding relationship between the source and the target language sentences. Accordingly, the accuracy of the transfer dictionary is too much dependent on the expert's knowledge and it takes much time and cost to develop a transfer dictionary. Furthermore, it requires much effort for maintaining consistency between the entries in the dictionary.

In view of the above problems, the present invention aims at providing a method and an apparatus for efficiently developing a high quality transfer dictionary by minimizing the human's effort.

SUMMARY OF THE INVENTION

The present invention provides a method and an apparatus in a data processing system for generating a transfer dictionary, which stores a pair of the source/target language sentences and corresponding source/target language structure information and is used in a transfer-based translation machine system. The method comprises the steps of: receiving from a user a pair of source/target language sentences, wherein said source language sentence comprises at least one idiom, at least one argument and at least one collocation and the collocation and the idiom therein are marked, respectively, and said target language sentence comprises a target language translation for the idiom and the source language word(s) for the argument; parsing the source language sentence to generate a corresponding source language syntactic tree data structure including a part-of-speech and syntactic information of each word in the source language sentence; extracting, from said source language syntactic tree data structure, nodes corresponding to the idiom, the collocation and the argument, respectively, in said source language sentence; calculating a least common ancestor node of the extracted nodes; generating source language structure information based on said source language syntactic tree data structure, wherein said language structure information starts from the information of the least common ancestor node; generating target language structure information by adding the part-of-speech information to each morpheme in said target language sentence and by replacing each source language word in said target language with the corresponding syntactic information within said source language syntactic tree data structure; and storing, as a new entry, the received source/language sentences and the generated source/target language structure information in the transfer dictionary.

DETAILED DESCRIPTION OF THE INVENTION

First, the basic concepts of several important terms used herein will be explained as follows:

Idiom: the fixed combination of at least one word in a source language sentence. Assuming that a source language is English and a target language is Korean, in a source language sentence "A have no idea B", for example, the words "have no idea" is an idiom.

Argument: a word position that can be replaced with any word(s) in a source language sentence. Namely, an argument serves as a variable in a source language sentence. For example, in the above-mentioned sentence example, "A" and "B" positions are referred to arguments.

Collation: a word position that limits the translation meaning of an idiom in a source language sentence when the idiom is translated into the target language. For example, in a source language sentence "A put on B", if "B" is a kind of clothes such as a coat, a shirt or the like, "put on" will be translated into 입다 ("ib-da") in Korean; while if "B" is a kind of shoes such as boots, ski or the like, "put on" will be translated into 신다 ("shin-da"). Accordingly, "B" portion is a collocation as well as an argument (as explained above).

Hereinafter, the embodiments of the present invention will be explained with reference to the accompanying drawings. First, referring to FIG. 1, there is shown a block diagram schematically illustrating the structure of an apparatus for developing a transfer dictionary according to a preferred embodiment of the present invention.

Figure 1:
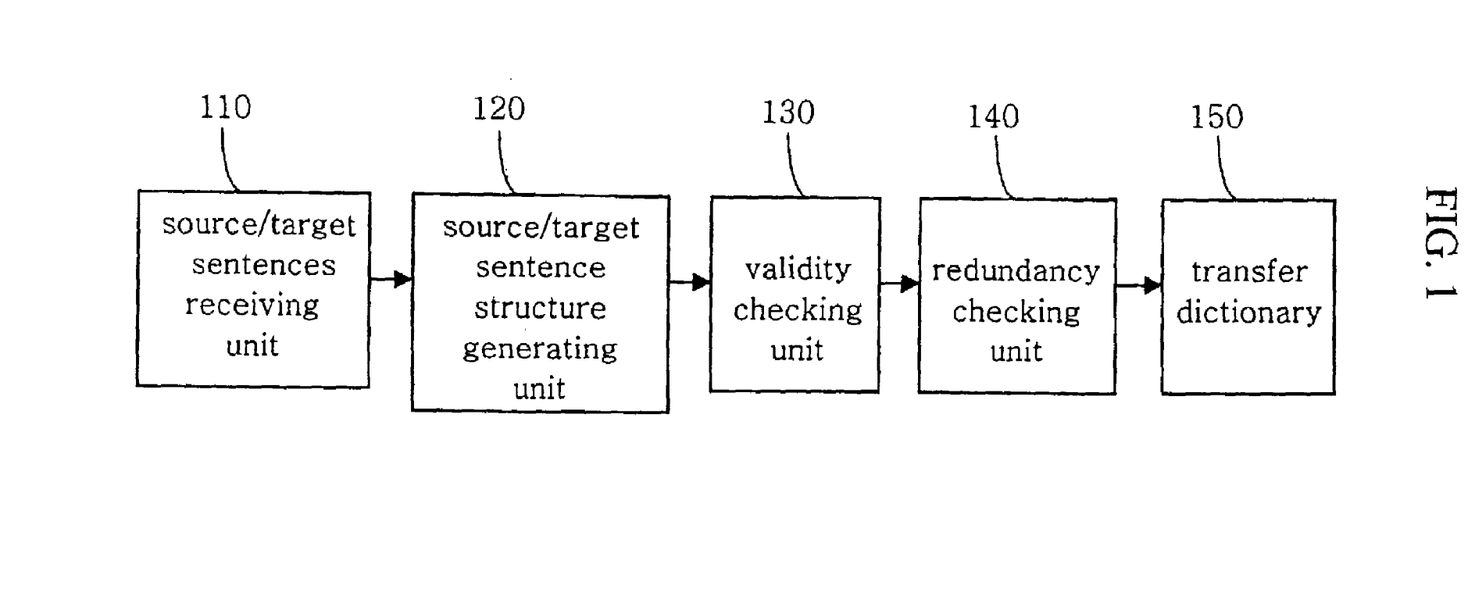
FIG. 1 is a block diagram schematically illustrating the structure of an apparatus for developing a transfer dictionary according to a preferred embodiment of the present invention.

A source/target sentences receiving unit 110 receives a pair of a source sentence and the corresponding target sentence, which are entered by a user and are to be processed to develop a new entry of a transfer dictionary, and stores them in a temporary storage. An example of a pair of source/target language sentences entered by a user are as follows.

Source language sentence: The +man *has *no *idea what she meant by those words.

Target language sentence: man 은 ("eun") meant ㄴ지를 모른다 ("eun-ji-reul mo-reun-da").

As the above, in order to develop a transfer dictionary in accordance with the present invention, a user shall input a pair of source/target language sentences according to given rules. The rules are so simple that the user need not know the specific knowledge on the structural differences between the source and the target languages. When inputting the source language sentence, the user indicates an idiom word(s) and a collocation word(s) that limits the translation meaning of the idiom word(s), using distinguishable markers such as "*", "+" and the like. In the above-mentioned example, the idiom "have no idea" is marked with a marker "*", while the collocation "man" is marked with another marker "+." (Because only a word(s) having a similar meaning to "man" (for example, he, she) can be put in the subject portion of the idiom "have no idea", the "man" is classified into a collocation with respect to the idiom "have no idea. Although the markers "*" and "+" have been used to indicate the idiom and the collocation words, respectively, other markers may be used instead.

When inputting the target language sentence, with respect to an idiom, the user will input the corresponding translation in the position of the idiom (i.e., in the above-mentioned example, 은 ㄴ지를 모른다 ("en eunjireul moreunda"); while, with respect to an argument, the user will input the original source language words (i.e., in the above example, "man" and "meant"). In addition, in case where the argument is composed of more than two words, the user has only to input the most important word among them (in the above-mentioned example, "man" and "meant"). The above-explained input rules do not require a user to have expert knowledge about both languages and he/she can input many sentences in a short time.

A source/target language sentence structure generating unit 120 will generate source language structure information and the corresponding target language structure information by analyzing the input source/target language sentences. The generating process of the present invention will be explained in detail with reference to FIG. 3.

A validity-checking unit 130 will check the validity of the generated source language structure information by determining whether the source language structure forms a phrase, which is a basic unit that the machine translation system performs the translation. If it is not valid, the system may allow the user to review whether the source/target language sentences have been correctly inputted and, if not, to correct them. The specific process of checking the validity of the source language structure information will be described with reference to FIG. 6.

A redundancy-checking unit 140 will check the redundancy of the generated structure information by determining whether the same target language structure information with the generated one has been already stored in the transfer dictionary DB 150. In order to check the redundancy, the unit 140 will first retrieve all the entries having the same idiom with that of the generated source language structure information, from the transfer dictionary DB 150, and then check if one of them has the same target language structure information with the generated target language structure information. If the generated information is found to be a redundant one, it will not be stored in the transfer dictionary DB 150 for data consistency. In general, an English-Korean transfer dictionary has more than 300,000 data entries. As the number of the dictionary entries is increased, it becomes more difficult to check whether the newly generated data has consistency with the existing ones in the transfer dictionary. The redundancy-checking unit 140 of the present invention will solve this problem and efficiently maintain the data consistency of the dictionary.

Figure 2:
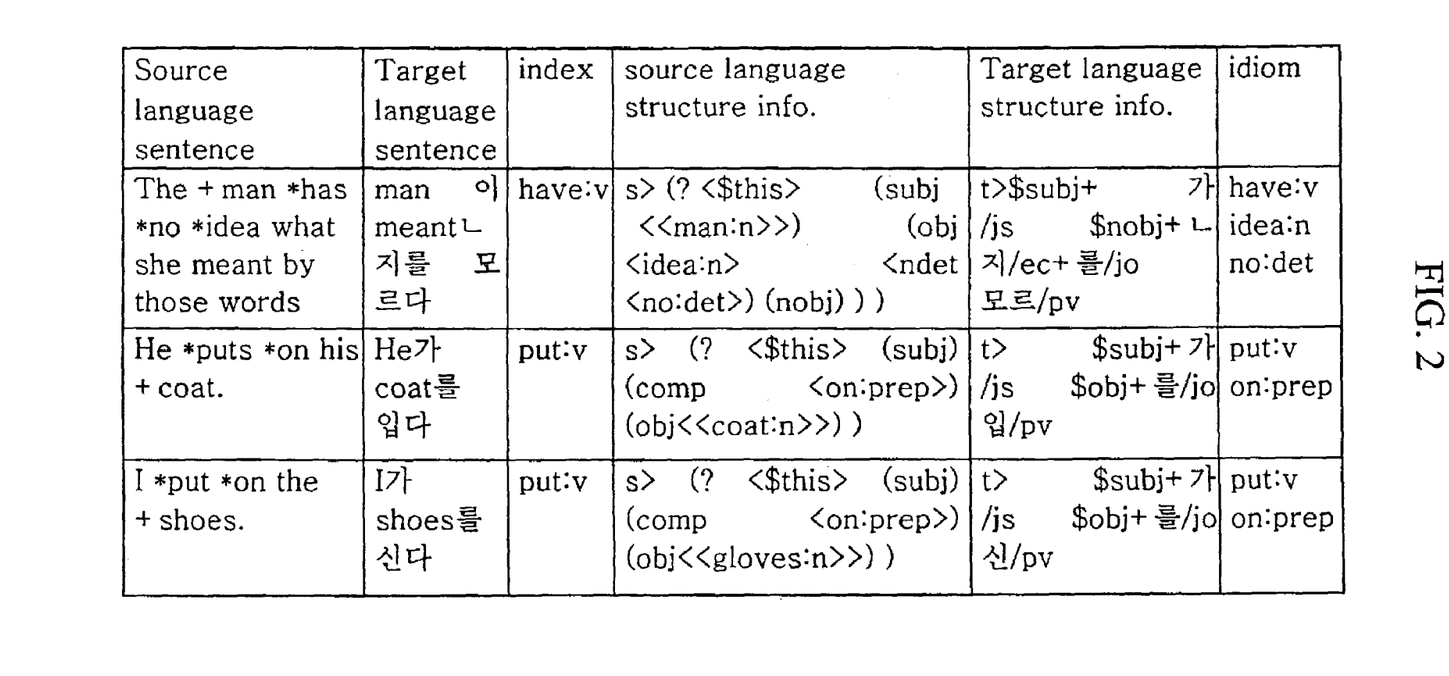
FIG. 2 is an example of a transfer dictionary database developed according to the present invention.

The original source/target language sentences input by the user and the source/target language structure information generated by the generating unit 120 and also checked by the validity-checking unit 130 and the redundant entry-checking unit 140 will be finally stored as a new entry in the transfer dictionary DB 150. As shown in FIG. 2, the entry of the transfer dictionary DB 150 will comprise the information on the "source language sentence", "target language sentence", "index word", "source language structure", "target language structure", and "idiom word." It is noted that, although only six items have been listed for the simplicity, other information items can be included in the entry, if necessary. At the "index" item, a word that corresponds to a root node of the source language syntactic tree will be stored. The "idiom" item will be used as a search keyword when the redundancy is checked by the redundancy-checking unit 140.

Figure 3:
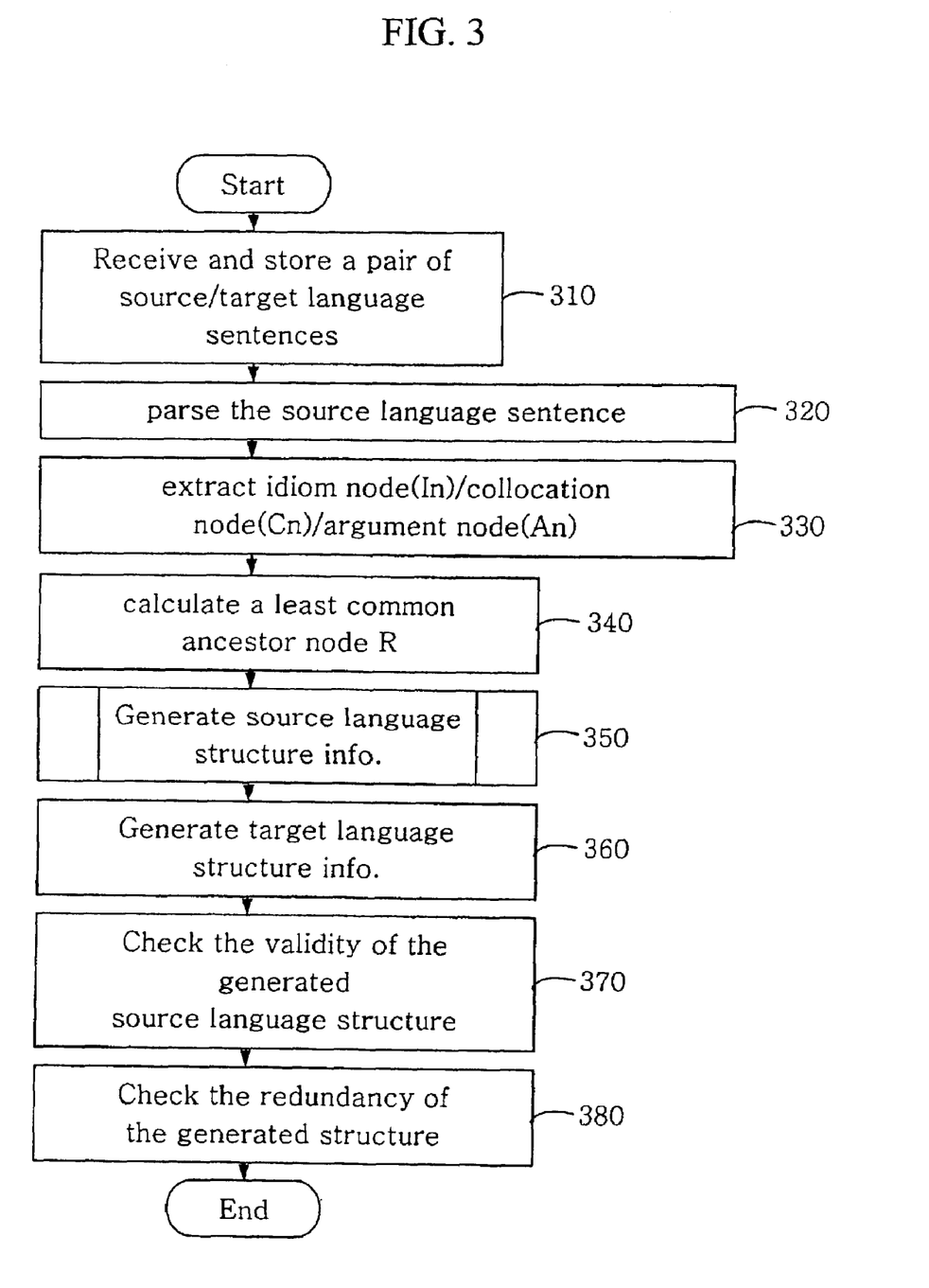
FIG. 3 is a flowchart illustrating the procedure for generating a new entry of the transfer dictionary database according to the preferred embodiment of the present invention.

Referring to FIG. 3, there is shown a flowchart illustrating the process for generating a new entry of the transfer dictionary database according to the preferred embodiment of the present invention.

In the step 310, a pair of the source language sentence and the target language sentence will be input by the user and stored in the temporal memory.

In the step 320, the source language sentence will be parsed by a parser. The parser is a program for analyzing the syntactic structure of the source language sentence and generating the source language syntactic information specifying the syntax relationship between the words within the source language sentence, usually in a tree data structure. Since any conventional parser can be used to parse the source language sentence, a more detailed explanation on the parser will be omitted. For your reference, the details of the parser and the parsing mechanism have been explained in the fourth chapter ("Parsing") of the book "Natural Language Process," written by Makoto Nagao.

Figure 5:
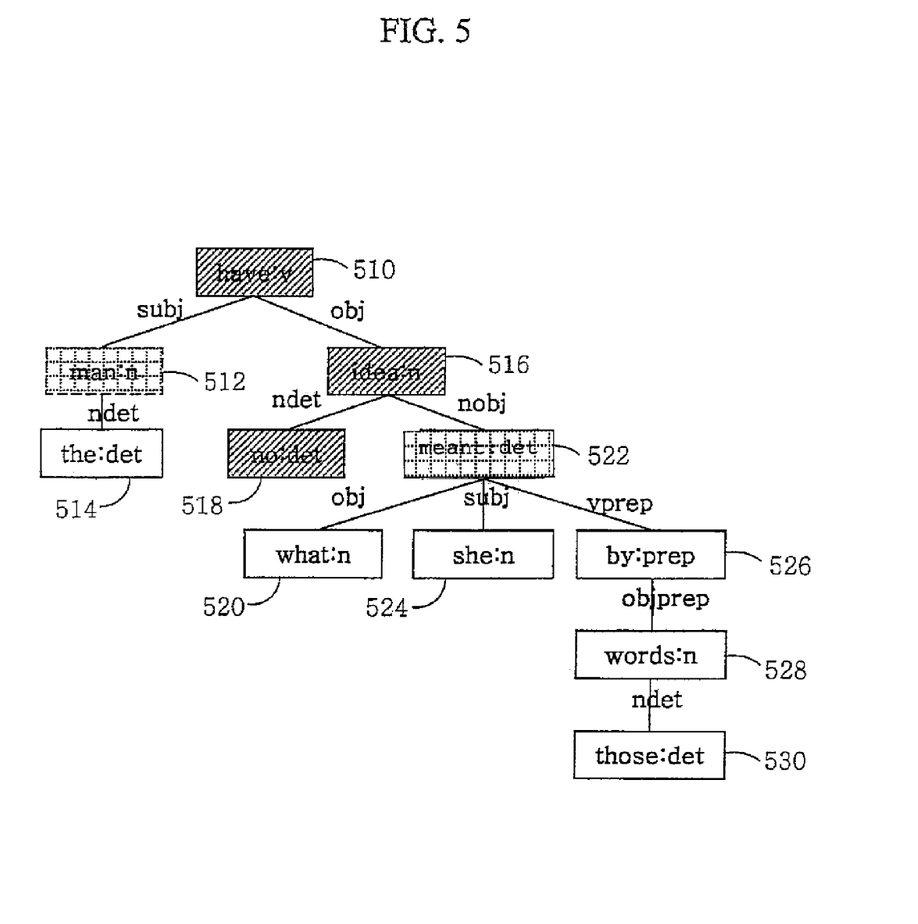
FIG. 5 illustrates the pictorial representation of the source language syntactic tree.

FIG. 5 shows the pictorial representation of the source language syntactic tree, which is the parsing result of the exemplary source language sentence, "The +man *has *no *idea what she meant by those words." As shown in FIG. 5, each node 510-530 represents each word within the sentence, respectively. A character at the side of each word (for example, "v" in the side of the word "have") indicates part-of-speech information of the word. For example, "n" is a noun; "v" is a verb; "det" is a definitive; and "prep" is a preposition. It will be easily understood that such characters are exemplary and are not limited thereto. An abbreviation on each edge (for example, "subj" on the edge between the node "have" and the node "man") indicates the syntactic relationship between the nodes. Some abbreviations are explained in the below table.

TABLE 1

| SYNTACTIC RELATIONSHIP | EXPLANATION |
|---|---|
| Subj | Subject |
| Obj | Object |
| Comp | Complement |
| Nobj | Object of the noun |
| Objprep | Object of the preposition |
| Ndet | Definitive of qualifying the noun |
| Vprep | Preposition phrase of qualifying the verb phrase |
| . . . | . . . |

The table illustrates only several examples, and it should be understood by those skilled in the art that various abbreviations may be used to indicate various syntactic relationships.

Referring again to FIG. 3, in the step 330, among the nodes within the source language syntactic tree, the idiom node(s) ("In") corresponding to the idiom word(s), the collocation node(s) ("Cn") corresponding to the collocation word(s), and the argument node(s) ("An") corresponding to the argument(s), which are collectively referred to "condition nodes", will be extracted based on the source language sentence and the target language sentence. As mentioned above, since the idiom word and the collocation word have been marked with markers "*" and "+" in the source language sentence, the nodes corresponding thereto can be easily extracted. As to the argument node, it will be extracted by searching the word expressed with the original source language in the target language sentence. In the source language syntactic tree shown in FIG. 5, the nodes 510, 516 and 518 corresponding to the words "*have", "*no", "*idea", respectively, are extracted as the idiom nodes; the node 512 corresponding to the word "+man" is extracted as the collocation node; and the nodes 512 and 522 corresponding to the words "man" and "meant", respectively, are extracted as the argument nodes.

In the step 340, a least common ancestor node R of the all the condition nodes will be calculated. In order to calculate a least common ancestor node R, the respective ancestor node set of each of the idiom nodes, the collocation nodes, and the argument nodes will be first calculated. The resulting ancestor node sets that have been calculated with respect to the source language syntactic tree of FIG. 5 are as follows:

TABLE 2

| NODE | ANCESTOR NODE SET |
|---|---|
| have: v | {have: v} |
| no: det | {no: det, idea: n, have: v} |
| idea: n | {idea: n, have: v} |
| man: n | {man: n, have: n} |
| meant: v | {meant: v, idea: n, have: v} |

As shown above, the ancestor node of the idiom nodes 510, 516, 518 is the node 510 corresponding to "have", the ancestor node of the collocation node 512 is the node 510, and the ancestor node of the argument nodes 512, 522 is the node 510. Among the intersection set of the respective ancestor node sets, the node with a highest level will be selected as a least common ancestor. In the above example, the node 510 corresponding to the word "have" will be selected as a least common ancestor node in the source language syntactic tree in the FIG. 5.

In the step 350, the source language structure information, starting from the word corresponding to the least common ancestor node (in the above example, "have"), will be generated. The source language structure information may include information on the syntactic relationship between a current node and its child node, the corresponding word and the part-of-speech information of the current node. Generally, the source language structure information is expressed using a parenthesis "(", and, after the symbol "(", the abbreviation for representing the syntax relationship between the nodes is provided. This syntax relationship is usually referred as a slot. (The detailed explanation of the slot is described in "Michael C. McCord, Slot Grammar: A System for simpler construction of practical natural language grammars. In R. Studer, editor, Natural Language and Logic: International Scientific Symposium, Lecture Notes In Computer Science, pages 118-145, Springer Verlag, Berlin, 1990".) Several abbreviations representing the syntax relationship have been explained in Table 1. In case where there is no need of defining a specific syntax relationship between the words, the symbol '?' will be marked, which means that all the syntax relationship is allowed.

Referring to the generation rules on each type of a node, the corresponding word and the part-of-speech information of an idiom node will be described in a form of "<word: the part-of-speech>", while those of a collocation word will be described in a form of "<<word: the part-of-speech>>". In case of an argument node, only the syntax relationship will be described.

Figure 4:
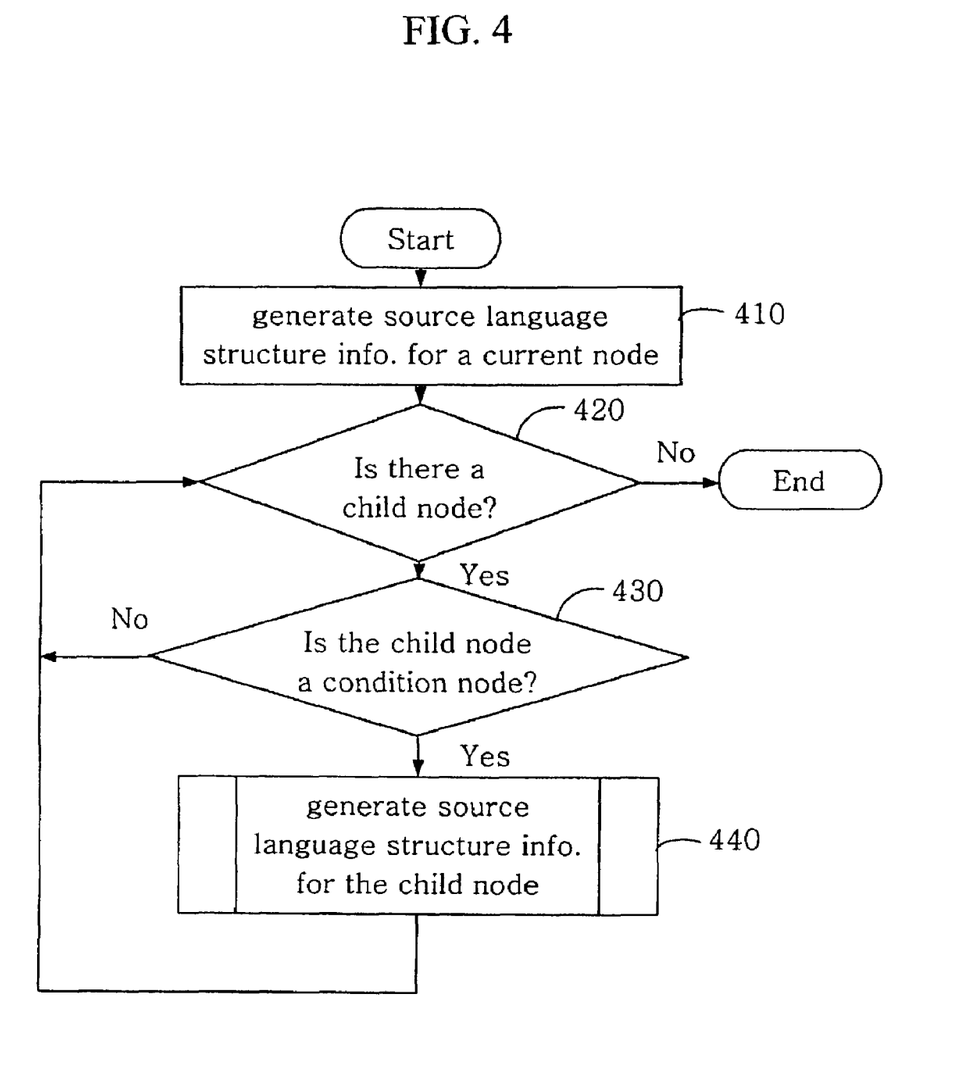
FIG. 4 is a flowchart illustrating the procedure for generating source language structure information according to the preferred embodiment of the present invention.

As shown in FIG. 4, the generation process of the source language structure information will be accomplished recursively. Specifically, in the step 410, source language structure information for a current node will be generated. Then, in the step 420, it will be determined whether there is a child node of the current node or not. If so, it will be also determined whether the child node is a condition node (that is, an idiom node, a collocation node, or an argument node) or not (step 430). As long as the child node is determined as a condition node, the source language structure information for the child node will be recursively generated (step 44), to generate all the source language structure information for every condition node.

The source language structure information generated based on the source language syntactic tree shown in FIG. 5 is as follows:
index
have: v
source language structure information
(?<$this>(subj<<man:n>>)(obj<idea:n>(ndet<no:det> (nobj)))

Please note that the word corresponding to the least common ancestor node (in the above example, "have") will be stored as an index in the transfer dictionary. As shown above, each of the idiom nodes 510, 516 and 518 are expressed as "(?<$this>)", "(obj <idea:n>)", and "(ndet <no:det>)", respectively. The expression "<$this>" shows the portion to be replaced with the index "have:v." Also, the collocation node 512 is expressed as "(subj <<man:n>>)", which shows that any word similar to the word "man" can be inserted into the subject position. The argument nodes 512 and 522 are expressed as "(subj<<man:n>>)" and '(nobj)', respectively.

Referring again to FIG. 3, in the step 360, the target language sentence structure information corresponding to the input target language sentence will be generated. In order to generate the target language sentence structure information, first, the part-of-speech information will be attached to each word by using a "target language part-of-speech attaching machine." The target language part-of-speech attaching machine is a program for adding the part-of-speech information to each morpheme of the target language sentence by using a target language morpheme dictionary. The detailed explanation of the part-of-speech attaching machine has been described in "Makoto Nagao, Chapter 3 Morpheme Analysis Natural Language Process". Several abbreviations showing the various kinds of part-of-speech in the target language will be described in table 3.

TABLE 3

| PART OF SPEECH | EXPLANATION |
|---|---|
| Js | subjective auxiliary word |
| Jp | objective auxiliary word |
| Ec | ending of a word for connection |
| Pv | verb |
| F | foreign word |
| Mm | unconjugated adjective |
| ... | ... |

For example, the result of attaching the part-of-speech to the target language sentence "man 이 meant ㄴ지를 모른다" will be "man/f+가/js meant/f+ㄴ지/ec+를/jo 모르/pv".

Next, the source language word(s) in the part-of-speech-attached target language sentence will be replaced with the corresponding syntax relationship information in the source language structure, resulting in the target language structure information. For example, the source language words, "man/f" and "meant/f", in the exemplary sentence of the target language will be replaced with "$subj" and "$nobj", respectively. The resulting target language structure generated according the above process will be.

"$subj+가/js $nobj+ㄴ지/ec+를/jo 모르/pv".

Next, in the step 370, the validity of the generated source language structure information will be checked by determining whether the source language structure forms a phrase, which is a basic unit on which the transfer-based machine translation system performs the translation. The checking process of the source language structure will be explained with reference to FIG. 6.

Figure 6:
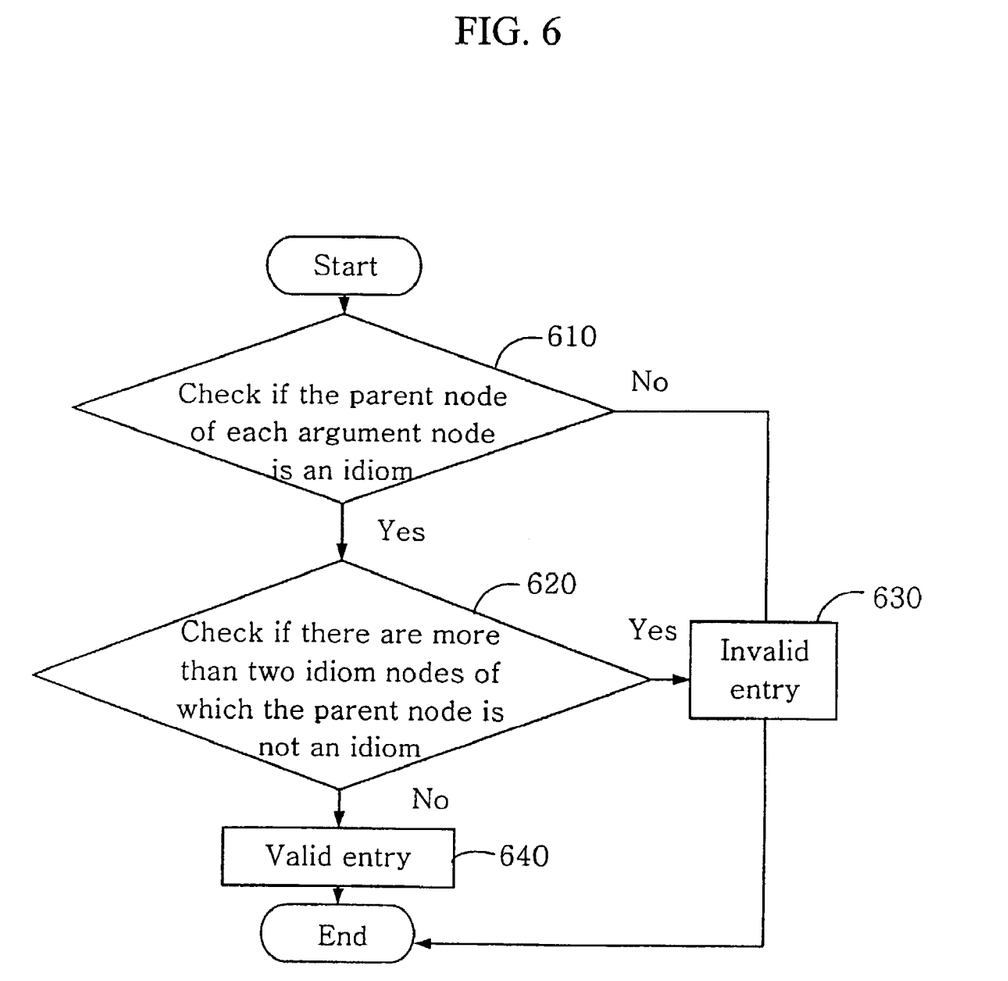
FIG. 6 is a flowchart illustrating the procedure for checking the validity of the source language structure information according to the preferred embodiment of the present invention.

FIG. 6 is a flowchart illustrating the procedure for checking the validity of the source language structure according to the preferred embodiment of the present invention. As shown, in the step 610, it will be decided whether the parent nodes of every argument nodes is an idiom node or not. If not, the source language structure is determined as not forming a phrase, therefore being invalid (step 630). Next, it will be checked whether there are more than two idiom nodes of which the parent node is not an idiom node (step 620). If so, since the idiom nodes form at least two phrases, the source language structure is also determined as being invalid (step 630). Alternatively, when it is found to be invalid, the system may allow the user to review whether the source language sentence and the target language sentence have been correctly input and, if not, to correct them.

Figure 7:
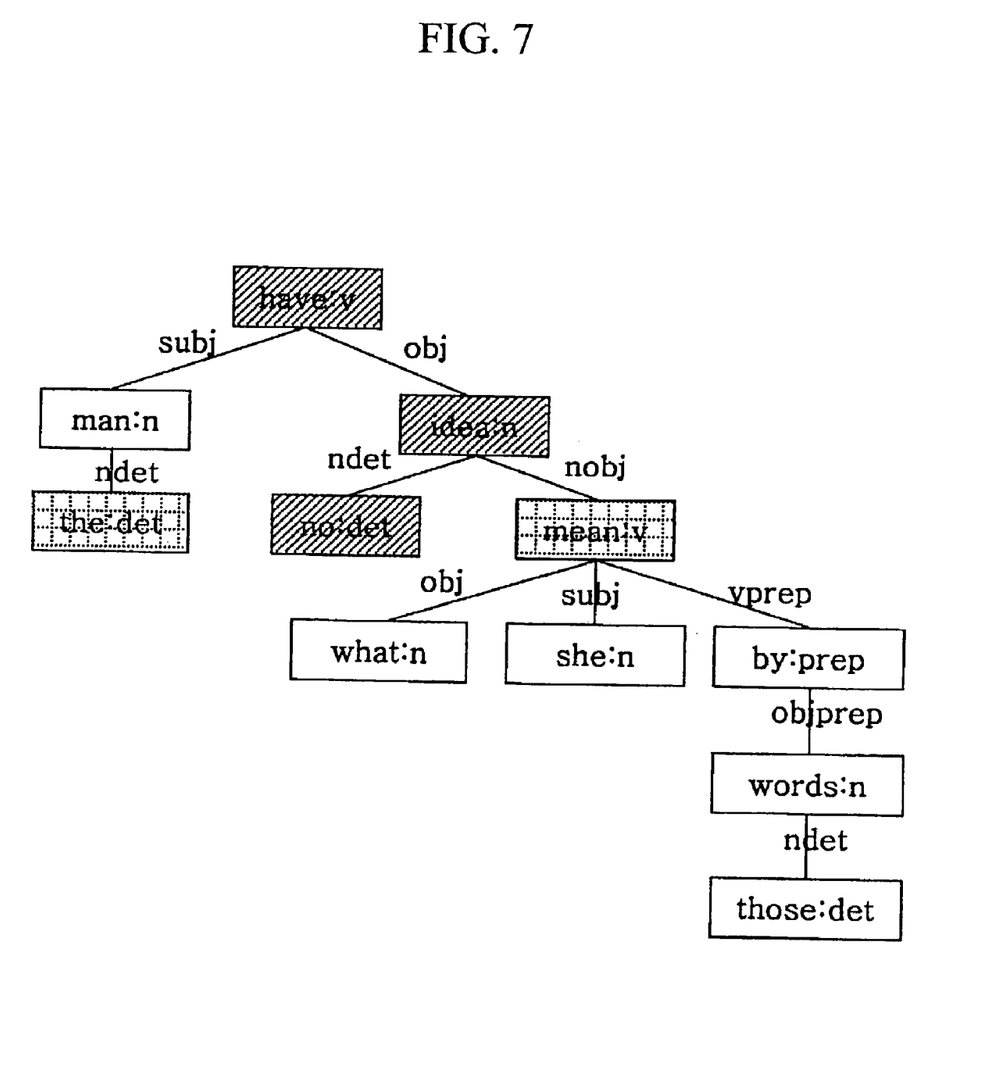
FIGS. 7 and 8 illustrate examples of the source language syntactic trees, which have been proven to be invalid according to the present invention.
Figure 8:
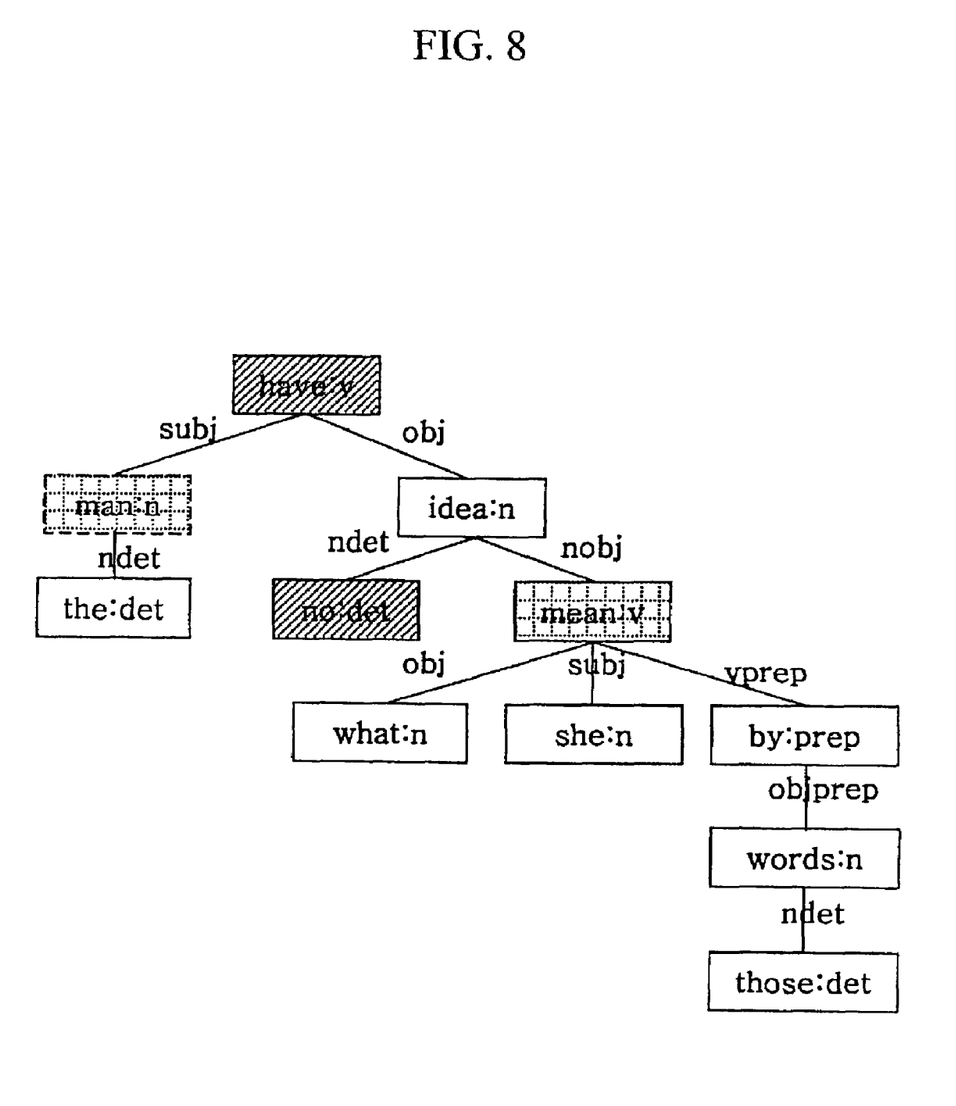

FIGS. 7 and 8 show the examples of the invalid source language structure. In FIGS. 7 and 8, it is assumed that the node indicated by oblique lines is an idiom node, the node indicated by checks is an argument node, and the node indicated by dotted line is a collocation node. FIG. 7 shows the case that the parent node of the argument node "the:det" has been proved to be a non-idiom node; and FIG. 8 shows the case that the parent nodes of the two idiom nodes ("have:v" and "no:det") have been proved to be non-idiom nodes.

Finally, referring to FIG. 3, in the step 380, the redundancy of the generated structure information 140 will be checked by determining whether the same target language structure information with the generated one has been already stored in the transfer dictionary. In order to check the redundancy, all the entries having the same idiom with that of the generated source language structure information will be first retrieved from the transfer dictionary. It will be then checked if one of the retrieved entries has the same target language structure information with the generated target language structure information. If the generated information is found to be a new one, it will be registered a new entry in a transfer dictionary, while, if it is found to be a redundant one, it will not be registered for data consistency. In an alternative embodiment, the system can allow the user to review whether a pair of newly generated source/target language structure information is a redundant one or not by displaying a list of the existing ones with the same idiom to the user.

For example, when the user inputs the source language sentence "I *put *on the +shirts" and the target language sentence "I 가 shirts 를 입다", a pair of the corresponding source/target language structure having the idiom "put on" will be generated as follows.

Source language structure:
(?($this>(subj)(comp <on:prep>)(obj<<shirt:n>>))
Target language structure:

$subj+가/js $obj+를/jo 입/pv

However, as shown in FIG. 2, since two existing entries 220 and 230 having the same idiom "put on" will be retrieved from the transfer dictionary and the entry 220 also has the same target language structure with the above one, it will not be registered as a new entry in the dictionary.

According to the present invention, since the rules of inputting a pair of source/target language sentences for generating a new entry in a transfer dictionary are so simple, a user can easily develop a transfer dictionary without knowing the specific syntactic knowledge about the source/target languages, thereby the time and cost required for the development can be considerably reduced.

Though the present invention has been illustrated and described with respect to exemplary embodiments thereof, the present invention should not be understood as limited to the specific embodiment, and it should be understood by those skilled in the art that the foregoing and various other changes, omission and additions may be made therein and thereto, without departing from the spirit and scope of the present invention.

The invention claimed is:

1. A method of generating a transfer dictionary used in a transfer-based translation machine system, the transfer dictionary storing a pair of the source/target language sentences and corresponding source/target language structure information, the method comprising the steps of:

receiving from a user a pair of source/target language sentences, wherein said source language sentence comprises at least one idiom, at least one argument and at least one collocation wherein the collocation and the idiom therein are indicated as such, and said target language sentence comprises a target language translation for the idiom and the source language word(s) for the argument;

parsing the source language sentence to generate a corresponding source language syntactic tree data structure including a part-of-speech and syntactic information of each word in the source language sentence;

extracting, from said source language syntactic tree data structure, nodes corresponding to the idiom, the collocation and the argument, respectively, in said source language sentence;

calculating a least common ancestor node of the extracted nodes;

generating source language structure information based on said source language syntactic tree data structure, wherein said language structure information starts from the information of the least common ancestor node;

generating target language structure information by adding the part-of-speech information to each morpheme in said target language sentence and by replacing each source language word in said target language with the corresponding syntactic information within said source language syntactic tree data structure; and storing, as a new entry, the received source/language sentences and the generated source/target language structure information in the transfer dictionary.

2. The method of 1, further comprising the step of determining a validity of said source language structure information by checking if it forms a phrase.

3. The method of 2, wherein the step of determining includes the steps of checking whether a parent node of each argument node extracted from the source language syntactic tree is an idiom node or not and checking whether there are more than two idiom nodes of which the parent node is not an idiom node.

4. The method of 1, further comprising the step of checking a redundancy of the generated source/target language structure information by retrieving all the entries having the same idiom with that of the generated source language structure information and checking if there already exists the same target language structure information with the generated target language structure information.

* * * * *